United States Patent
Nagata

[11] Patent Number: 5,571,241
[45] Date of Patent: Nov. 5, 1996

[54] PRIMATE CONTAINMENT CAGE TO RESTRICT MOVEMENT

[75] Inventor: Ryoichi Nagata, Yoshida, Japan

[73] Assignee: Shin Nippon Biomedical Laboratories, Ltd., Japan

[21] Appl. No.: 319,423

[22] Filed: Oct. 6, 1994

[30] Foreign Application Priority Data

Dec. 1, 1993 [JP] Japan .................................. 5-325751

[51] Int. Cl.⁶ .............................. A01K 1/03; A61D 3/00
[52] U.S. Cl. ......................... 119/473; 119/481; 119/732; 119/752
[58] Field of Search ............................ 119/17, 751, 752, 119/732, 473, 481, 453, 454

[56] References Cited

U.S. PATENT DOCUMENTS

| | | | |
|---|---|---|---|
| 3,747,567 | 7/1973 | De Smit | 119/752 |
| 4,991,543 | 2/1991 | Silberman | 119/17 |
| 5,233,939 | 8/1993 | Randolph | 119/17 |

FOREIGN PATENT DOCUMENTS

| | | | |
|---|---|---|---|
| 2250510 | 6/1975 | France | 119/17 |
| 2666006 | 2/1992 | France | 119/17 |
| 2520654 | 11/1976 | Germany | 119/17 |
| 2716451 | 10/1978 | Germany | 119/17 |
| 1512167 | 5/1978 | United Kingdom | 119/17 |

*Primary Examiner*—Todd E. Manahan
*Attorney, Agent, or Firm*—Bierman and Muserlian

[57] ABSTRACT

A cage for restraining primate such as monkey to be used for experimental animal while performing experimental procedure. The cage comprises a rectangular framework which is fabricated from a top horizontal panel, two side panels and a bottom panel, a front door panel and a partition panel which is slidably mounted in the rectangular framework and can be secured thereto in the desired position.

5 Claims, 3 Drawing Sheets

PRIMATE CONTAINMENT CAGE TO RESTRICT MOVEMENT

BACKGROUND OF THE INVENTION

This invention relates to a primate containment cage, and more particularly to a cage for preventing a primate from free movement during the performance of an experimental procedure.

In order to improve or develop new drugs or medicine for the diagnosis or curing of human disease, it is necessary to first examine the effects the medicine on animal models such as mice, rats, guinea pigs, dogs, rabbits and non-human primates.

As non-human primates (hereinafter referred to as "monkeys") are physiologically similar to humans, it is generally recognized that the effects of a test article on non-human primates can be judged as potential effects on humans. In order to obtain useful and applicable data from these experiments it is important to minimize the stress on the animal and to insure the accurate administration of the dosage involved.

To administer a test article to monkeys by way of oral, intranasal or intravenous injection, to collect blood, or to externally examine organs, for example, pupil and the like, it is imperative to restrain the monkey and to limit its movement so as to allow for accurate examinations and test article administration.

The monkey involved in such procedures, however, usually will not stay still during the experimentation. Furthermore, it is possible that the monkey may become so excited as to become violent, resulting in any injury risk to both the animal and the experimenter.

In view of the foregoing, it is an object of the present invention to provide a primate containment cage for preventing the monkey from movement that may adversely impact the efficacy of the experiment.

It is a further object of the present invention to provide a containment cage which provides for the complete safety of both monkey and the experimenter as well as reducing the animal's level of stress.

BRIEF DESCRIPTION OF THE DRAWINGS

Other and further objects and advantages of the present invention will become more apparent from a consideration of the following specification read in conjunction with the annexed drawings, in which.

DESCRIPTION OF THE INVENTION

Figure 1:
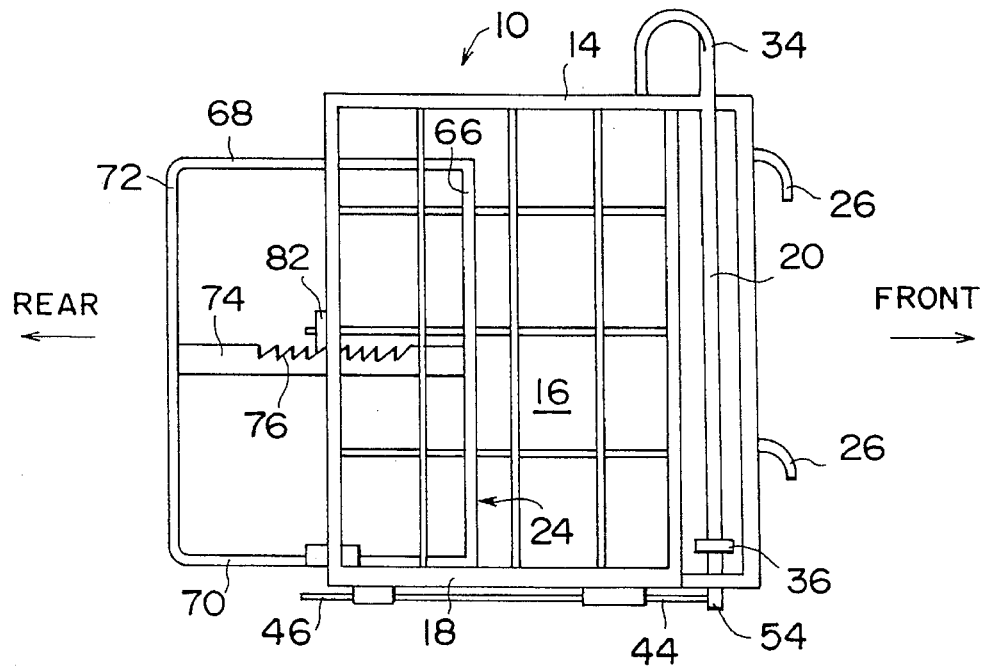
FIG. 1 is a schematic side elevation of a preferred embodiment of a cage according to the present invention, parts being broken away for clarity.

Referring now to the drawings, in FIG. 1, there is shown generally at 10 a primate containment cage according to the present invention. The cage 10 includes a rectangular framework 12 consisting of a top horizontal panel 14, right and left vertical panels 16 and a bottom horizontal panel 18 rigidly connected with each other in the rectangular design. All of these panels are substantially of a conventional lattice-like structure, fabricated from solid horizontal and vertical bars arranged in a largely parallel/perpendicular fashion.

At the front of the cage 10, there is a front door panel 20 which can be opened or closed by manual operation. The uppermost horizontal bar 22 of the door panel 20 is positioned above the top horizontal panel 14 in order to allow for convenient operation.

The rear end of the framework 12 is closed by a partition panel 24 which can be moved horizontally within the framework 12 and fixed at a desired position, thereby determining the area of movement allowed to the animal.

A single monkey is transferred into the cage 10 from a standard animal pen (not shown) in which the monkey is residing. In order to mount the cage 10 to the door of the standard pen, four modified attachment hooks 26 are respectively secured to the upper and lower portions of the front vertical post 42 of the right and left panels 16.

Figure 2:
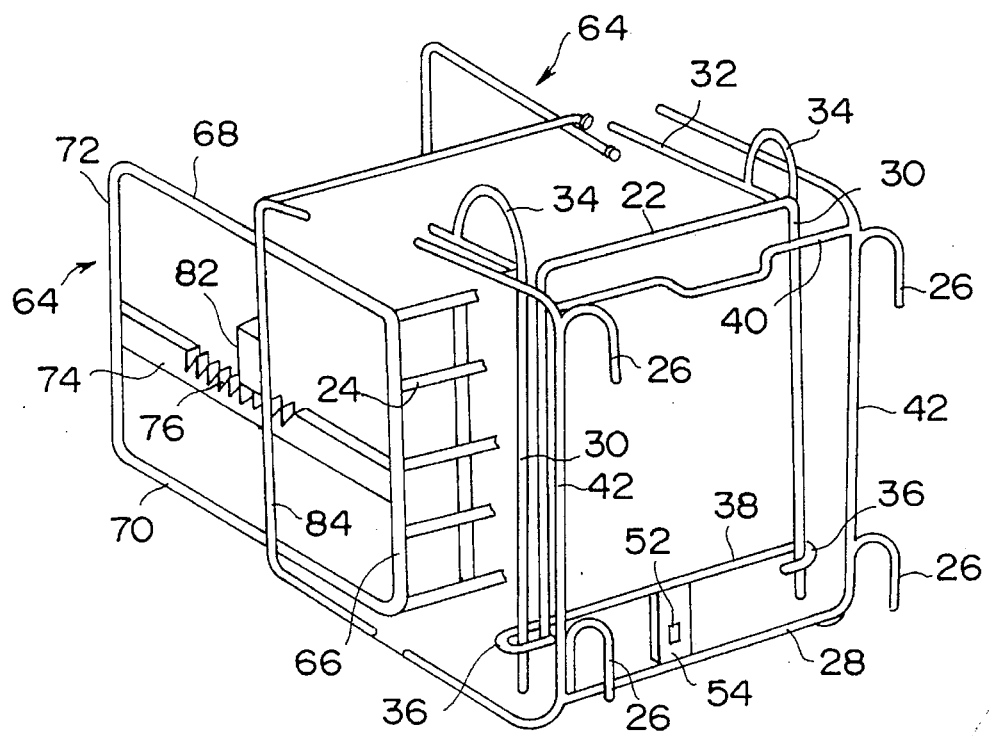
FIG. 2 is a partial cutaway view in perspective of the cage according to the present invention.

As shown in FIG. 2, the upper end of each of the vertical door posts 30 is connected to the top horizontal panel 14 by a U-like portion 34.

The front door panel 20 is secured to the vertical posts 30 by means of ring sections 36 formed at the both ends of the lower horizontal bar 38 of the front door panel 20. The door panel 20 can be fully opened by manually lifting it along the vertical posts 30 and laid on the upper horizontal panel 12. To support the front door panel 20 in the closed position, a stopper 40 is bridged between the front vertical posts 42 of each of the side panels 16.

Figure 3:
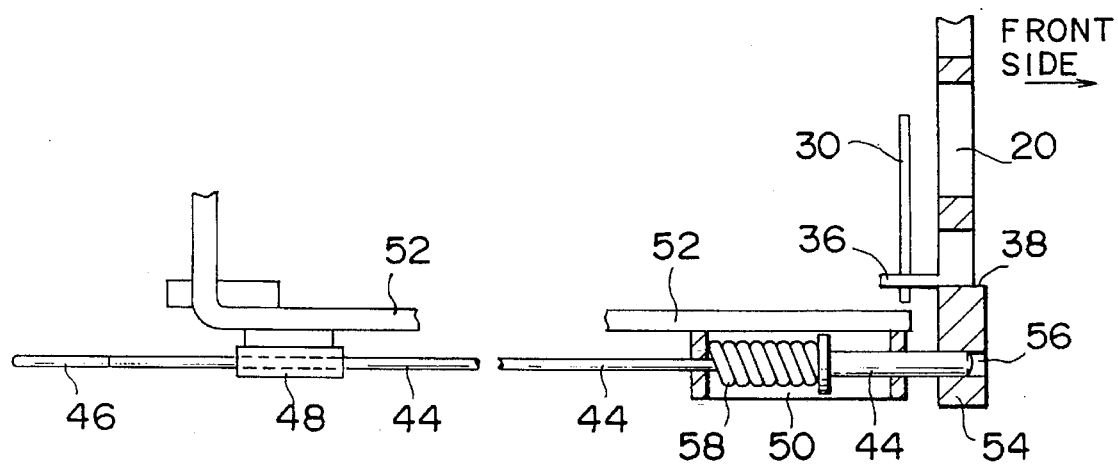
FIG. 3 is a schematic side elevation of lock mechanism for a rear door panel of the cage according to the present invention.

To latch the front door panel 20 in closed position, as is shown in FIG. 3, a lock lever 44 having a handle section 46 is extended along the underside of the cage 10 from the rear side thereof to the front door panel 20. The lock lever 44 is supported by means of a rear holder 48 secured to the lower rear horizontal framework bar 28 and the front holder 50 is secured to a plate mounted below the front three bars of the bottom panel 18.

At a central portion of the lower horizontal bar 38 of the front door panel 20, there is a female coupling section 54 having an opening for receiving the male coupling of the lock lever 44 which is biased to the locked position by means of a coiled spring 58 supported within the front lock casing 50.

Figure 4:
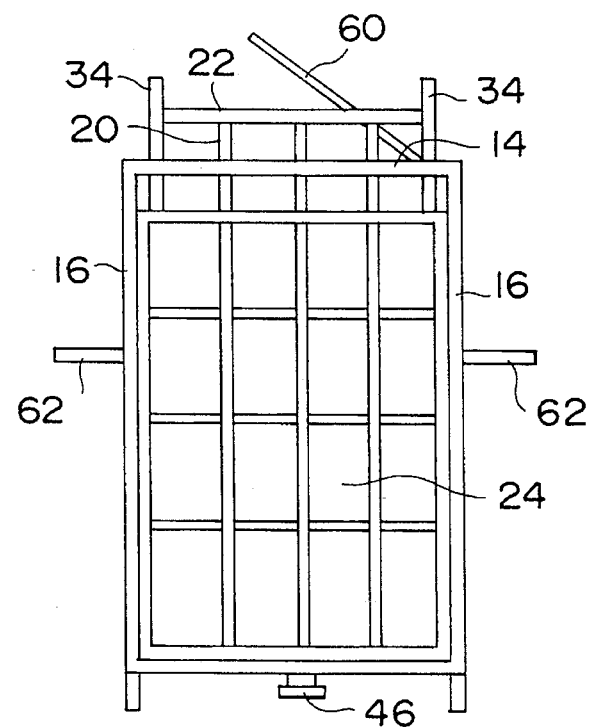
FIG. 4 is a rear elevation of the cage in which the top administration hatch is partially open.
Figure 5:
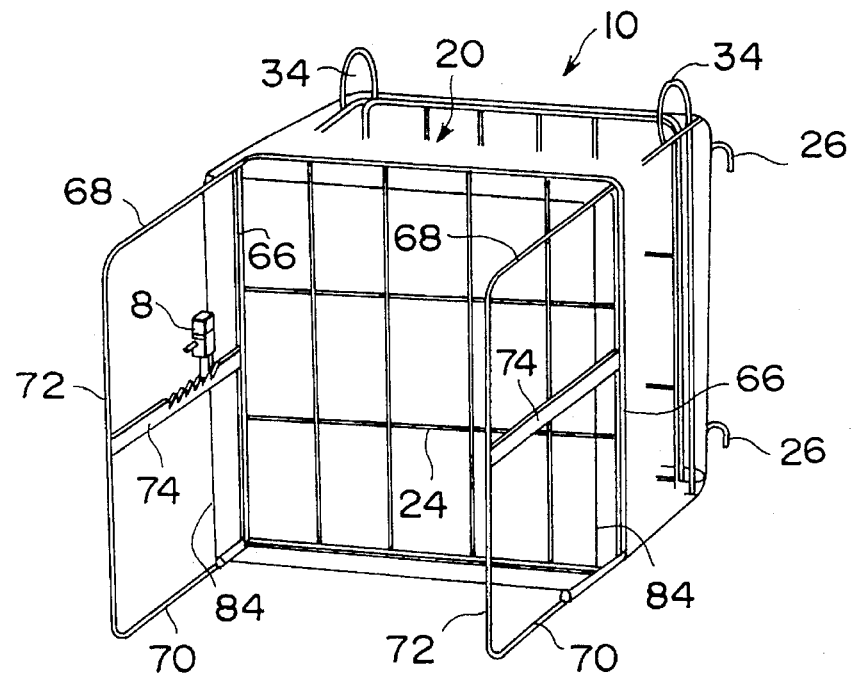
FIG. 5 is a schematic perspective view illustrating a partition panel according to the present invention.

As shown in FIG. 4, a small administration hatch 60 is hinged to one of the upper horizontal bars of the top panel 14 so as to give access to the monkey in the cage 10. The administration hatch 60 is locked by suitable means to prevent the monkey from escaping.

The cage 10 may be provided with handles 62 for carrying.

According to the present invention, the space between the front door panel 20 and the horizontally sliding partition panel 24 can be adjusted by moving the panel 24 within the rectangular framework 12, so as to prevent adverse movement by the monkey confined in this space during the performance of the experiment.

In order to manipulate the partition panel 24, two side frames 64 each of which extend backwards from the panel 24 are used.

The side frame 64 are secured to the corresponding vertical posts of the partition panel 24. The side frame 64 consists of three horizontal bars connected to vertical posts of the partition panel 24. The bottom rail 70 and top rails 68 are used to guide the partition panel 24. The bottom rails 70 are run through two tube sections connected to the right and left vertical panels 18 so as to improve the rigidity of the partition during movement. The middle rail 74 has ratchet teeth 76 on the upper side in order to engage the lock 78.

Figure 6:
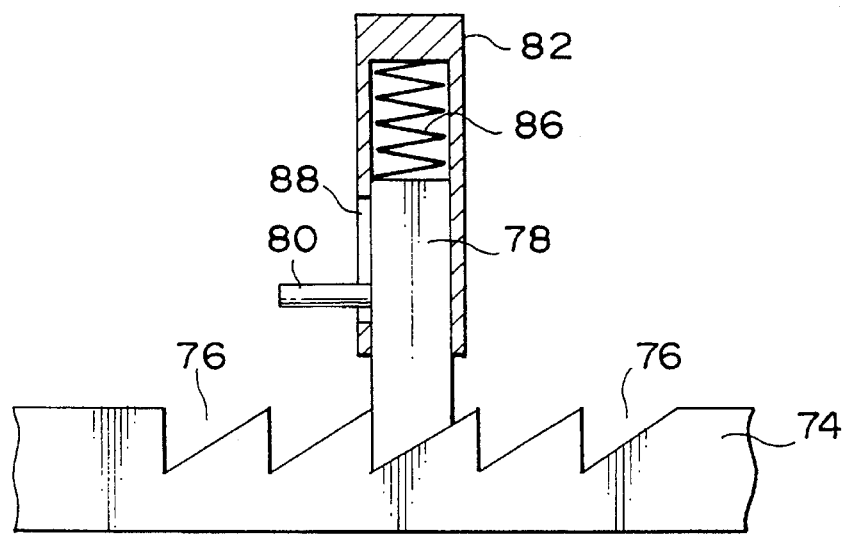
FIG. 6 is a schematic sectional side view of an adjustable lock mechanism for the partition panel according to the present invention.

The lock 78 has a release knob 80 which is mounted within a casing 82, which is secured to the rear vertical post 84 of the side vertical panel 16, and is biased downwardly by a spring 86 mounted within the casing 82 so as to allow the partition panel 24 to be moved forward, but not allowing it to move backwards unless the lock 78 is disengaged using release knob 80, as shown in FIG. 6.

The aforementioned release knob 80 is operated by lifting the release knob 80 along a groove 88 formed in the casing 82.

It should be apparent that the foregoing relates only to the preferred embodiment of the present invention, and that numerous changes and modifications thereto may be made without departing from the scope of the invention as defined in the following claims.

What is claimed is:

1. In a primate containment cage comprising a rectangular framework which is fabricated from a top horizontal panel, two side panels and a bottom horizontal panel, a front door panel which is movably mounted on a front opening side of the rectangular framework, a partition panel which is slidably mounted in the rectangular frame from a rear opening side, and means for positioning the partition panel to the rectangular framework in the desired position, the upper end of the front side vertical posts of the cage being connected to each of the side bars of the top horizontal panel by an inverted U-like portion to mount the front door panel thereon so as to open or close the front door panel when the cage has been mounted on a standard layer animal pen.

2. A primate containment cage as claimed in claim 1 in which the side vertical posts of said framework have forwardly facing attachment hooks.

3. A primate containment cage as claimed in claim 1 in which said partition panel is slidably mounted within said rectangular framework so as to adjust for a space between said front door panel and said partition panel therein.

4. A primate containment cage as claimed in claim 1 in which said partition panel has a handling means formed from two side frames, each side frame including a pair of vertically spaced top and bottom rails and a middle rail.

5. A primate containment cage as claimed in claim 1 in which said positioning means includes ratchet teeth provided on an upper surface of a middle rail provided to said partition panel and a lock member housed in a casing mounted on a rear vertical post of said side panel, said lock member being biased downwardly to engage with said ratchet teeth.

* * * * *